July 29, 1924.
G. N. FROLICK
ELECTRIC HEATER
Filed Sept. 29, 1922
1,502,819
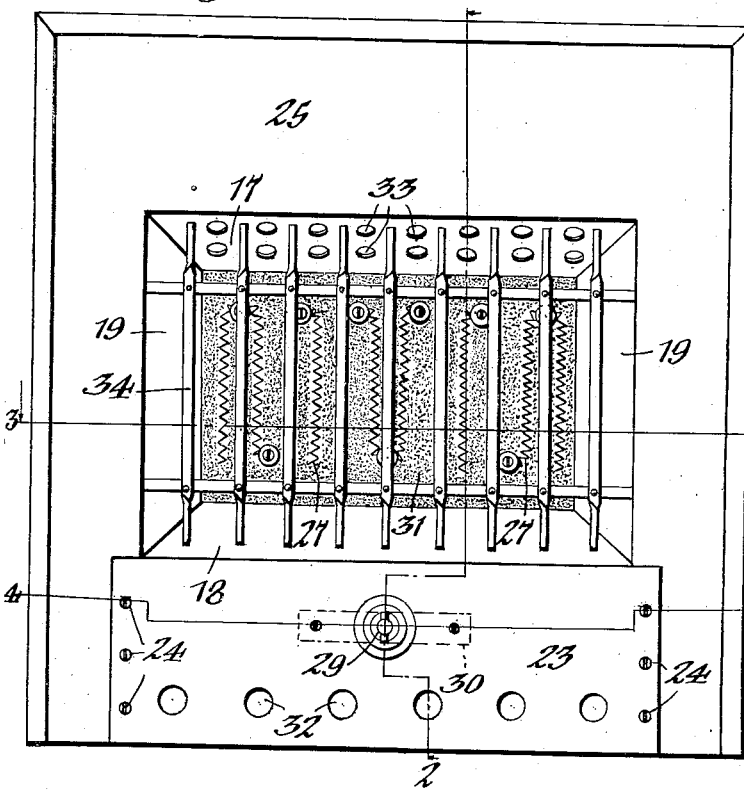
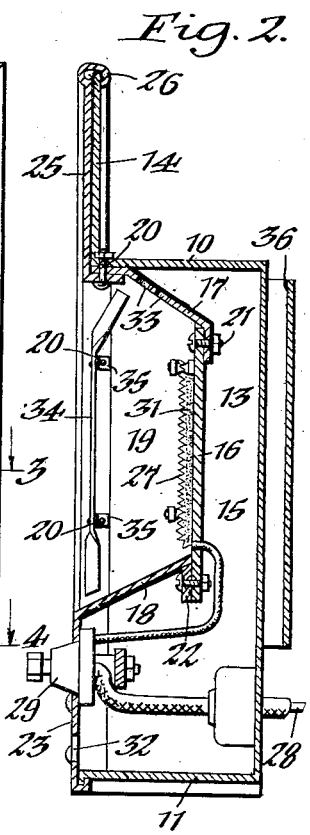
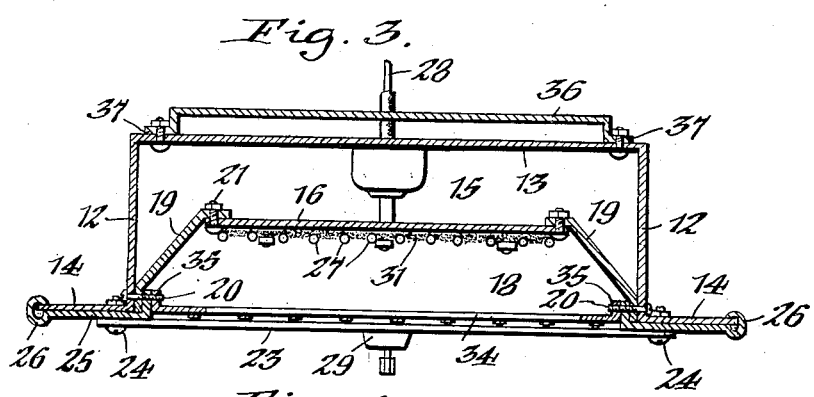
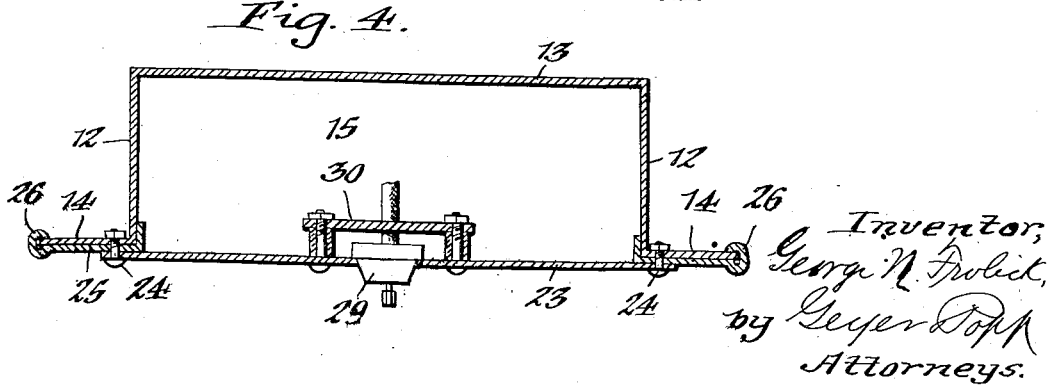
Inventor,
George N. Frolick,
by Geyer Popp
Attorneys.

Patented July 29, 1924.

1,502,819

UNITED STATES PATENT OFFICE.

GEORGE N. FROLICK, OF BUFFALO, NEW YORK, ASSIGNOR TO FRANK S. WENDLING, OF CLEVELAND, OHIO.

ELECTRIC HEATER.

Application filed September 29, 1922. Serial No. 591,217.

*To all whom it may concern:*

Be it known that I, GEORGE N. FROLICK, a citizen of Germany, resident of Buffalo, in the county of Erie and State of New York, have invented new and useful Improvements in Electric Heaters, of which the following is a specification.

This invention relates to an electric heater or fire place.

One of its objects is to provide an improved heater of this character which is capable of producing a maximum quantity of heat with a minimum expenditure of electric power.

A further object is to provide a simple and inexpensive heater which is so constructed as to be readily accessible for repairs to the electrical connections and other parts.

In the accompanying drawings:

Figure 1 is a front elevation of a heater embodying my improvements. Figure 2 is a transverse vertical section on line 2—2, Fig. 1. Figures 3 and 4 are horizontal sections on the correspondingly numbered lines in Fig. 1.

Similar characters of reference refer to like parts throughout the several views.

The main casing or body of the heater is constructed of sheet metal and is preferably of rectangular box-like form consisting of a top wall 10, a bottom wall 11, side walls 12 and a rear wall 13, the front side of the casing being open. The top and adjoining sides of the casing preferably terminate at their front edges in a marginal flange or border 14.

Arranged within this casing and suitably attached thereto is a heater shell which is closed on all sides except its front side and which is spaced from the walls of said casing to form an air space 15, as shown in Figs. 2 and 3. This shell consists of a rear wall 16 preferably of asbestos board or similar material, a top wall 17, a bottom wall 18 and side walls 19. As shown in the drawings, the top and side walls of this shell are fastened at their front ends to the corresponding walls 10, 12 of the casing by screw bolts 20 or other appropriate fastenings, and the rear wall 16 of said shell is secured by screw bolts 21 to the adjoining portions of the top and side walls of said shell. The lower front side of the rear wall 15 is provided with a transverse bar or cleat 22 upon which the rear end of the bottom wall 18 of the heater shell rests. As shown in Fig. 2, said bottom wall 18 is spaced an appreciable distance from the corresponding bottom wall 11 of the casing and is provided at its front end with an integral depending portion or fender 23 for closing the space formed between said walls, this fender being attached at its ends to the adjoining casing flange 14 by bolts 24.

Extending over the front face of the casing flange is a slip jacket 25 of substantially inverted U-shaped form whose outer marginal portions are crimped or bent over the corresponding edges of said flange, as shown at 26, while their inner marginal portions are bent inwardly and are secured in place by the bolts 20.

Mounted on the front side of the rear wall 16 of the heater shell are the electric heating elements 27 which may be of any suitable and well known construction and which are arranged in an electric circuit including the feed wires 28 and a multiple heat switch 29 of ordinary construction. This switch is preferably mounted centrally of the fender 23 and is suitably held in place between the rear side of the latter and a strap 30 fastened to said fender. If desired, the heating elements may be embedded in asbestos wool 31 to better retain the heat produced thereby.

The fender 23 is provided with a series of air inlet openings 32 and the top wall 17 of the heater shell is provided with a series of outlet openings 33, whereby the cold air is drawn from the floor and is forced upwardly through the air space 15 where it becomes heated before it is discharged through said outlet openings into the room. This construction promotes air circulation in the room in which the heater is located and insures heating of the room in a minimum period of time and with a minimum expenditure of electric power.

The open front side of the heater shell is provided with a guard or protective grating 34 which is provided on opposite sides with rearwardly-extending perforated ears 35 which are adapted to be sprung over the ends of the bolts 20 for removably holding it in position.

As shown in Figs. 1, 2 and 3, the top, bottom and side walls of the heater shell preferably converge inwardly toward the rear wall 16 so that they act as deflectors for directing the heat outwardly into the room.

In order to enable this heater to be placed against the side walls of a room without danger of scorching or burning them, the rear side of the heater casing is provided with a guard plate 36 which is spaced from the rear wall 13 of said casing. As shown, this guard plate extends substantially the full width and height of the casing and is provided with forwardly offset flanges 37 for attaching it to the rear wall of the casing.

Should it be necessary to gain access to the electrical connections within the enclosed space 15, the bottom wall 18 of the heater shell together with its attached fender 23 is disconnected from the casing by removing the bolts 24.

I claim as my invention:

1. A heater of the character described, comprising a casing open at its front side, a shell arranged in said casing and spaced from the walls thereof to form an air space the bottom wall of said shell being detachable and in spaced relation to the corresponding bottom wall of the casing and having a depending front portion for closing the space between said walls, and an electric heating element mounted on the rear wall of said shell, the latter being provided at its upper and lower ends with air passages communicating with said air space.

2. A heater of the character described, comprising a casing open at its front side, a shell arranged in said casing and spaced from the walls thereof to form an air space, the top and side walls of said shell being joined adjacent their front ends to the corresponding walls of said casing to close the upper portion and adjoining side portions of said air space, and the bottom wall of said shell having a depending portion for closing the lower portion of said air space, and an electric heating element mounted on the rear wall of said shell, said top wall and the depending portion of said bottom wall having air passages communicating with said air space.

3. A heater of the character described, comprising a casing open at its front side, a shell arranged in said casing and spaced therefrom to form an air space extending from the bottom to the top thereof, the bottom wall of said shell being disposed above the bottom of the casing and provided with an integral depending fender extending to said casing bottom, means for detachably connecting said bottom wall and its fender to said casing, and an electric heating element mounted on the rear wall of said shell, the upper portion of the latter and said fender having air passages communicating with said air space.

4. A heater of the character described, comprising a casing, a heating element mounted in said casing, and a guard plate spaced from the rear wall of said casing and having forwardly offset flanges for attaching the plate to the casing.

GEORGE N. FROLICK.